United States Patent [19]

Brooke et al.

[11] Patent Number: 4,631,524

[45] Date of Patent: Dec. 23, 1986

[54] CAPACITIVE ENCODER HAVING MULTIPLE PRECISION OUTPUTS

[75] Inventors: Raymond Brooke, Calabasas; Gaston Palombo, Agoura, both of Calif.

[73] Assignee: Computer Memories, Inc., Chatsworth, Calif.

[21] Appl. No.: 490,571

[22] Filed: May 2, 1983

[51] Int. Cl.[4] .............................................. G08C 9/02
[52] U.S. Cl. ........................... 340/347 P; 340/347 M; 318/662
[58] Field of Search ...................... 340/347 P, 347 M; 250/231 SE, 237 G; 318/662

[56] References Cited

U.S. PATENT DOCUMENTS

| | | | |
|---|---|---|---|
| 3,068,457 | 12/1962 | Nevius | 323/200 |
| 3,219,920 | 11/1965 | Wall | 323/122 |
| 3,312,892 | 4/1967 | Parnes | 323/93 |
| 3,599,004 | 8/1971 | Grendelmeier | 250/237 G X |
| 3,702,467 | 11/1972 | Melnyk | 340/200 |
| 3,784,897 | 1/1974 | Norrie | 323/93 |
| 3,938,113 | 2/1976 | Dobson et al. | 340/200 |
| 3,961,318 | 6/1976 | Farrand et al. | 340/200 |
| 4,040,041 | 8/1977 | Fletcher et al. | 340/200 |
| 4,507,647 | 3/1985 | Minami et al. | 340/347 P |

Primary Examiner—T. J. Sloyan
Attorney, Agent, or Firm—Spensley Horn Jubas & Lubitz

[57] ABSTRACT

A capacitive position encoder which provides a digital output indication of the relative position between two plates. One of the plates includes first and second conductive input areas which are separated by a gap having the shape corresponding to a square wave. The second plate includes a number of rectangular output pads whose length is equal to one-half of the wavelength of the square wave. The pads are separated from one another by an integral fraction of the wavelength. Periodic input signals which are the inverse of one another are applied to the input areas and are capacitively coupled to the output pads. When the degree of overlap between an output pad and the input areas is equal, a null signal will be generated. Each pad will provide a null signal corresponding to a different position of the plates.

10 Claims, 11 Drawing Figures

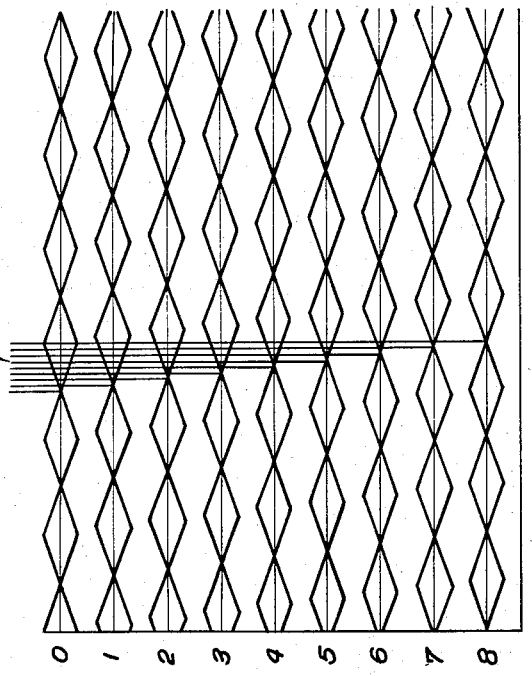
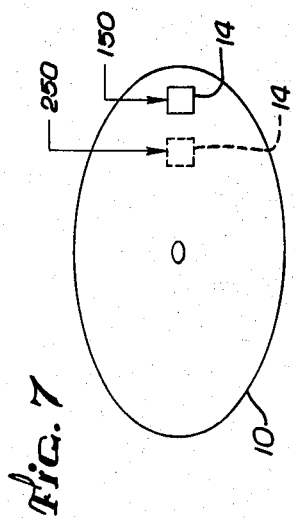
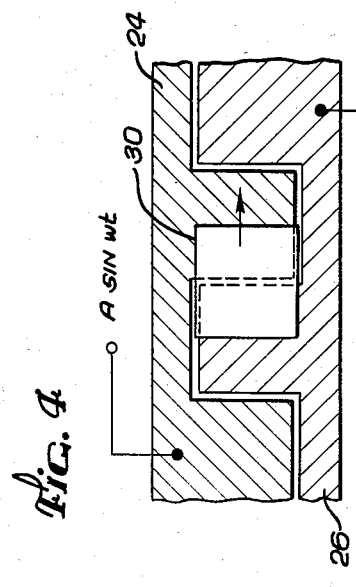
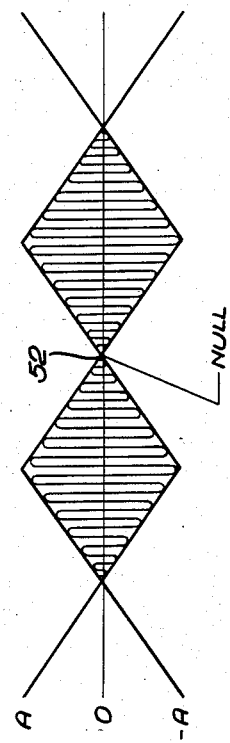

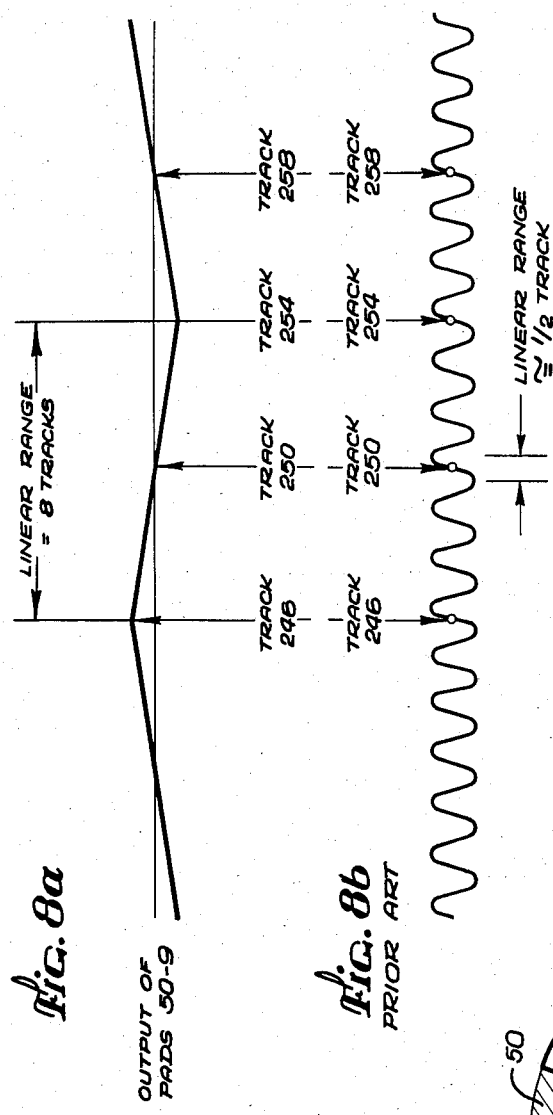
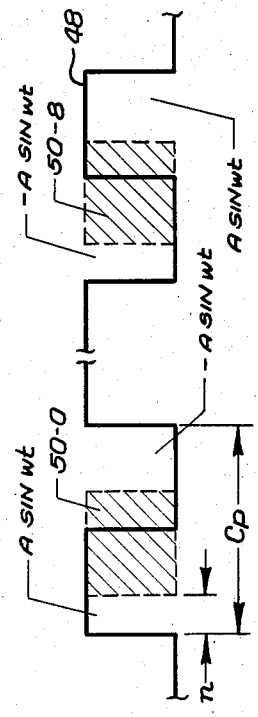
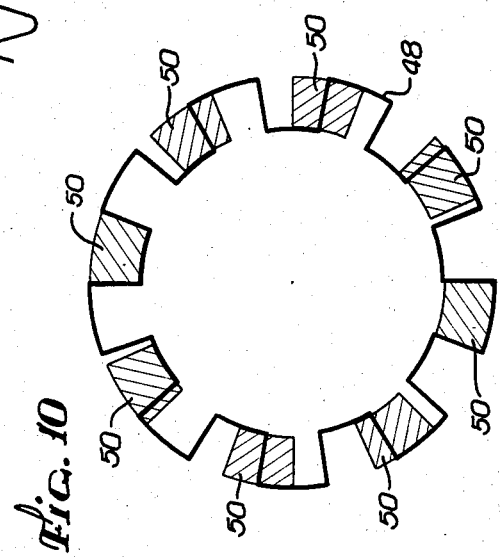

CAPACITIVE ENCODER HAVING MULTIPLE PRECISION OUTPUTS

BACKGROUND OF THE INVENTION

1. Field of the Invention

This invention relates to position encoders and more particularly to position encoders which utilize capacitive coupling in order to provide a position indication. Still more particularly, the present invention is directed to a capacitive encoder for use in positioning the read/write heads in a rotating memory system.

Rotating memories, i.e., disc type memories, store data in a circular fashion. The data in the memory is accessed by moving a magnetic head across the radius of the disc. The trend in the design of rotating memories is to increase the memory capacity through higher track density and higher bit density. Recent designs in hard disc ("Winchester") systems have achieved track densities on the order of 700 tracks per inch. Typically, the magnetic head used to read data is positioned by means of a servomotor which drives an arm to which the head is attached.

The trend toward high track density has created the need for a high resolution positioning system to accurately locate the head with respect to the tracks. This is accomplished by employing an encoder to determine the position of the shaft of the servomotor to thereby determine the head position. The encoder must be able to provide precise velocity and direction information and should have low inertia and high stability.

2. Description of the Prior Art

Most encoders presently in use in rotating memory systems are optical encoders which generally include a metal or glass disc having a series of apertures or markings, a mask and an optical system. The output of such encoders cannot be described precisely in mathematical form and digitizing of the output is imprecise. Furthermore, this type of encoder often has significant stability problems. In addition, such encoders are generally expensive, expecially if high resolution is required.

Although not generally employed with rotating memory head positioners, various other position encoders have been developed which employ capacitive coupling between a pair of moving plates. Encoders of this type are disclosed in U.S. Pat. Nos. 3,961,318 to Farrand, et al., 3,219,920 to Wall, 3,938,113 to Dobson, et al., 3,702,467 to Melnyk, 3,784,897 to Norrie, 3,312,892 to Parnes, 3,068,457 to Nevius, and 4,040,041 to Fletcher, et al. These encoders typically include a first plate having a pair of conductive input areas which are separated by a gap having a periodic waveform and a second plate in facing relation to the first plate which includes conductive output areas which capacitively couple to the input areas by an amount which is determined by the relative position of the two plates.

SUMMARY OF THE INVENTION

The present invention is directed to an improved capacitive encoder. The encoder includes two plates which are movable with respect to each other. One plate includes a pair of conductive input areas which are separated by a gap which has the shape of a square wave (or corresponding to a square wave if the encoder is a rotary encoder). The second plate includes a number of substantially rectangular conductive output areas whose length is equal to one-half of the wavelength of the square wave pattern. The output areas are equally spaced with respect to each other and overlap the gap on the first plate. The spacing between the output areas is equal to an integral fraction of the square wave wavelength. As the plates move with respect to each other, the overlap of each output area with respect to the input areas will vary linearly from zero to one hundred percent. The input areas are provided with periodic input signals which are out of phase with respect to each other. These input signals are capacitively coupled from the input areas to the output areas. As a result of the linear variation in overlap, the output signals developed will also vary linearly. When an output area overlaps the two inputs areas equally, the input signals will cancel each other out, thereby resulting in null output. As the plates move with respect to each other, adjacent output areas will provide successive null outputs. Each null output provides a precise indication of the position of the plates with respect to each other.

BRIEF DESCRIPTION OF THE DRAWINGS

The invention will now be described with reference to the accompanying drawings, wherein:

FIG. 4 is a plan view showing the overlapping relationship of a single output area with respect to the gap separating the input areas;

FIG. 5 is a diagram of the output signal produced by the output area shown in FIG. 4;

FIG. 6 shows diagrams of output signal envelopes generated by adjacent output areas;

FIG. 7 is a plan view showing a head unit positioned adjacent two different tracks on a memory;

FIGS. 8A and 8B show output signals generated by the present invention and a typical prior art encoder, respectively;

FIG. 9 is a diagramatic view indicating the relative positions of two opposite phase output pads; and FIG. 10 is a diagramatic view of a rotary configuration of the invention.

DESCRIPTION OF THE PREFERRED EMBODIMENT

The following description is of the best presently contemplated mode of carrying out the invention. This description is made for purpose of illustrating the general principles of the invention and is not to be taken in a limiting sense. The scope of the invention is best determined by the appended claims.

Figure 1:
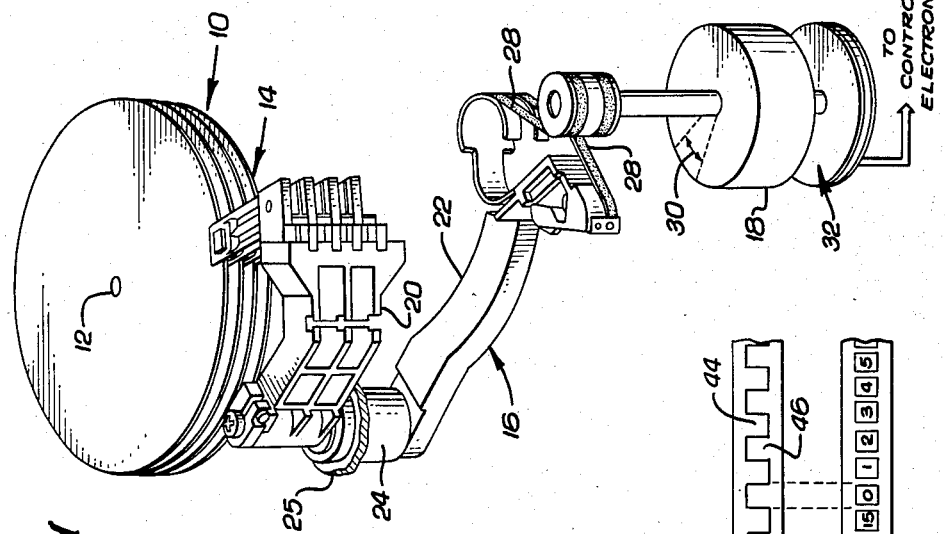
FIG. 1 is a perspective view of a head positioner used to position a magnetic head unit with respect to the tracks of a memory disk in a disc drive system.

Referring to FIG. 1, a memory disc unit 10 which typically includes a plurality of individual discs is rotatable about a hub 12. In order to read data from the disc unit 10, a plurality of magnetic heads 14 are movable radially across the disc unit 10. The heads are movable by means of a positioning mechanism 16 driven by a motor 18. The positioning mechanism 16 includes a support arm 20 for the heads 14, a connecting arm 22 coupled to the support arm through a ball bearing pivot 24 which is supported by a base casting 25, a capstan 26 connected to the motor shaft and metal bands 28 which couple the capstan to the connecting arm. The motor 18 rotates a limited amount as indicated by arrow 30 in order to drive the connecting arm and move the heads with respect to the disc unit 10. An encoder 32 is used to determine the position of the motor shaft, which in turn can be used to determine the head position relative to the memory discs.

Figure 2:
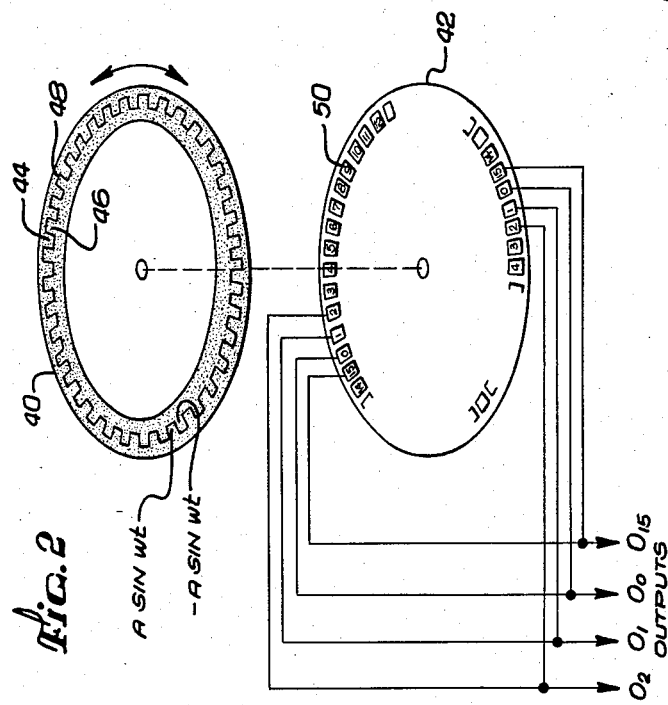
FIG. 2 is a perspective view of the plates of a rotary embodiment of the encoder of the present invention.

As shown in FIG. 2, the encoder 32 is comprised of a pair of plates 40 and 42 which are concentric and are rotatable with respect to each other. In the present embodiment of the invention, the plate 40 is coupled to the motor shaft and rotates with the shaft, and the plate 42 is stationary. The plate 40 includes first and second conductive input areas 44 and 46, respectively. The input areas, which in the present embodiment are formed of copper, are separated by a gap 48 having a shape corresponding to a square wave. In the preferred embodiment, a single layer of copper is formed on the plate 40 and the gap is defined by etching away some of the copper. Input signals $A\sin\omega t$ and $-A\sin\omega t$ are coupled to the input areas 44 and 46, respectively. In the present embodiment of the invention, the encoder is used to detect only a partial revolution of the motor 18 and the input signals may therefore be connected directly to the input areas without encountering any problems with respect to tangling of the input connections. Alternatively, oscillators used to generate the input signals may be directly attached to the plate 40. In other applications the input signal may be indirectly coupled to the input areas (e.g., by capacitive coupling), thus eliminating the need for wire connections to the plate 40.

A plurality of copper output pads 50 are formed on the surface of the second plate 42 in facing relation to the gap 48. Output pads which are similarly positioned with respect to the gap 48 are connected together, as will be described in more detail subsequently.

Figure 3:
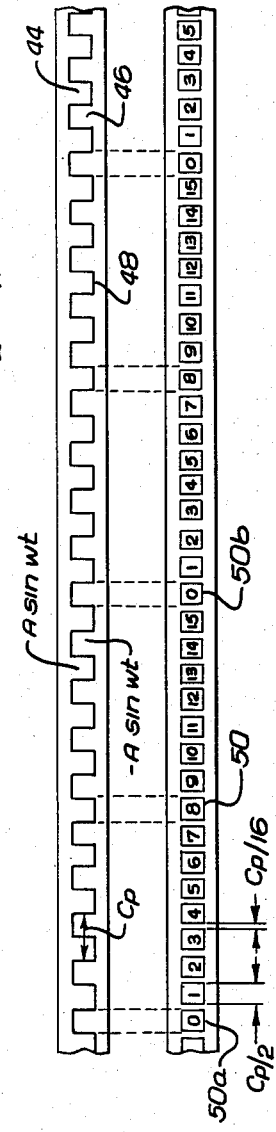
FIG. 3 is a plan view showing the relationship between the input areas and output areas of the plates a linear embodiment of the encoder of the present invention.

The capacitive encoder of the present invention can be constructed in either a linear or rotary format. For the purpose of simplicity the principles of operation of the encoder will be described with respect to a linear configuration. The relationship between the input areas and output pads in such a configuration is illustrated in FIG. 3. In FIG. 3, the gap 48 is indicated as having a wavelength of $C_p$. Each of the output pads 50 has a shape corresponding to the shape of one-half wavelength of the gap 48 and has a length which is equal to one-half of the wavelength of the gap 48, i.e., $C_p/2$. The spacing between each pad is equal to an integral fraction of $C_p$, i.e., $C_p/N$, where N is an integer. Because of this, every Nth output pad will be similarly positioned with respect to the gap 48. In the illustrated embodiment, N is equal to 16. Thus, if an output pad 50a is precisely aligned with respect to the gap waveform 48, a pad 50b sixteen pads away from the pad 50a will also be in alignment with the gap.

Referring to FIG. 4, as the two encoder plates move with respect to one another, the output pads 50 will traverse the gap 48. As this happens, the overlap between the output pads 50 and the areas 44 and 46 will vary linearly. The input signals $A\sin\omega t$ and $-A\sin\omega t$ will be capacitively coupled to the pad 50 by an amount which is determined by the degree of overlap between the areas 44 and 46 on the pad 50, respectively. Thus, when the pad 50 is overlapping only the area 44, the signal $A\sin\omega t$ will be coupled to the pad. Similarly, when the pad overlaps only the area 46, the signal $-A\sin\omega t$ will be coupled to the pad. When the pad overlaps part of each area as shown in FIG. 4, both input signals will be coupled to the output pad. The degree of coupling is dependent upon the amount of overlap between the pad and the respective areas. Thus, as the pad 50 traverses the gap 48, it will provide an output signal which is a sine wave whose peak amplitude is modulated in a linear fashion, as illustrated in FIG. 5. When the degree of overlap between the pad 50 and the input areas 44 and 46 is equal, as illustrated in FIG. 4, the contribution of each of the input signals will be equal and they will therefore cancel each other out. Thus, a null signal as indicated at 52 in FIG. 5 will result. When the pad overlaps the area 44 to a greater extent than the area 46, the output signal will be equal to $A\sin\omega t$ reduced in amplitude by the contribution of the signal $-A\sin\omega t$, and when the pad 50 overlaps the area 46 to a greater extent than the area 44, the signal on the output pad will be equal to $-A\sin\omega t$ reduced in amplitude by the contribution of the signal $A\sin\omega t$.

Thus, the signal envelope at each output pad will vary linearly and a null signal will be produced at each output pad whenever it overlaps the input areas 44 and 46 equally. Since the output pads 50-0 through 50-15 are each positioned differently with respect to the gap 48 (FIG. 3), each output pad will provide a null signal corresponding to a different position of the plates with respect to one another. Null signals at adjacent pads will correspond to the spacing between the pads. Thus, a null signal will be generated for each $C_p/16$ amount of relative movement between the plates. This situation is indicated in FIG. 6 for pads 50-0 through 50-8. The output signal at each pad will have the same form but will be offset with respect to other pads by an amount equal to some multiple of $C_p/16$.

The operation of the encoder as it relates to controlling the positioning of the head unit 14 will now be described with reference to FIG. 7. Assuming for the sake of illustration that the head unit is positioned at track 150 and a command is received to move to track 250. The head unit must therefore traverse one hundred tracks. If each null output from the encoder corresponds to movement of the distance between adjacent tracks, there will be one hundred null outputs from the encoder during the move. Thus, by employing electronics well known in the art the output of the encoder can be monitored and the nulls counted and the motor stopped at the one hundredth null. For example, if the output of pads 50-1 provide a null at track 150, the pads 50-9 will provide a null at track 250. By initially counting the total number of nulls from all outputs of the encoder and then monitoring the output of the pads 50-9, the head unit can be precisely positioned at the desired track.

The provision of the multiple output encoder of the present invention contributes greatly to the accuracy of positioning of the motor in response to a command. As illustrated in FIG. 8A, the signal on the output pad 50-9 will be a null when the head unit 14 is at track 250 and will vary linearly around the null as the head unit moves between tracks 246 and 254. Thus, once the head unit passes track 246, the output pads 50-9 provide a signal which varies linearly with the position of the head unit with respect to track 250. Because of the relatively wide range of linearity, the likelihood of the system overshooting to the next null position (track 258 in FIG. 8B) is remote. In contrast, a conventional encoder has a single output which has a null corresponding to each track, as illustrated in FIG. 8B. The linear range around track 250 is extremely limited, thus increasing the possibility of overshoot past the desired track and positioning of the head unit at the incorrect null (from track 250 to track 251 in the figure). By providing multiple output pads having offset null positions as in the present invention, the desired resolution can be achieved while maintaining an expanded linear range.

In the ideal situation, any given output pad is subjected to a capacitive coupling from the portion of the input areas directly facing it. In actuality, however, each pad is subjected to a parasitic coupling capacitance (noise) from adjacent areas. This noise can be substantially reduced by combining signals from output pads which are out of phase with respect to each other. For example, the output pads 50-0 and 50-8 in FIG. 3 have opposite phase relationships with respect to the waveform 58. The out-of-phase output signals are indicated in FIG. 6. More particularly, the relative positioning of the pads 50-0 and 50-8 is illustrated in FIG. 9. The signal at pad 50-0 is as follows:

$$V_o = (C_p/2 - n) A\sin\omega t - nA\sin\omega t + N$$

where $C_p$ is the wavelength of the square wave 48, n is the portion of the input area 44 which is not overlapped by the pad, and N is the noise due to parasitic capacitive coupling. Similarly, the signal at pad 50-8 is as follows:

$$V_8 = -(C_p/2 - n) A\sin\omega t + n\sin\omega t + N$$

In this situation it is assumed that the noise N at each pad is approximately the same. In order to obtain a signal representative of the pad 50-0 with the noise eliminated, the signal $V_8$ is subtracted from the signal $V_o$:

$$(C_p/2 - n) A\sin\omega t - nA\sin\omega t + N - (-(C_p/2 - n) A\sin\omega t + nA\sin\omega t + N) = 2(C_p/2 - n) A\sin\omega t - 2nA\sin\omega t$$

which is twice the value of the first two terms of $V_o$. The difference signal between the pads 50-0 and 50-8 is thus proportional to the signal at the pad 50-0 without the influence of noise. Thus, the noise in an output signal at any pad can be substantially eliminated by subtracting the output signal at the opposite phase pad.

The present invention has several other advantages over prior art devices. In the rotary embodiment, the output pads are distributed in a circle, and the gap separating the input areas is also in the form of a circle, as indicated in FIG. 10. In FIG. 10, both the gaps 48 and output pads 50 are distorted with respect to a linear format so that the overlap will vary linearly as the plates rotate with respect to each other. Because of the circular format, any errors due to misalignment between the plates will be averaged out, since an error in a signal at one output pad due to misalignment will be precisely compensated for by an error of the opposite magnitude at an output pad which is on the opposite side of the circular configuration. As a result, the system is relatively immune to mechanical construction errors. The accuracy of the outputs is thus dependent upon the ability to precisely form and position the input areas and output pads on the plates.

An additional advantage of the present invention is the ability to provide automatic gain control, i.e., to control the amplitude of the input signals to thereby control the amplitude of the encoder output signals which are used to control the Servo positioning of the head unit. Automatic gain control is provided by developing a signal which is proportional to the amplitude of the output signal independent of the position of the plates. To do this, each of the output signals on the pads 50 is full wave rectified and the rectified signals are added together to develop a signal whose amplitude is independent of encoder position.

A further advantage of the present invention is that because the output envelope of the encoder is linear over a range of eight tracks (or more), it is possible to extract velocity information (i.e., a voltage proportional to speed) more accurately than with an encoder system which provides a sine wave output. The velocity signal is obtained by differentiating the position signal.

In summary, the present invention is directed to a capacitive encoder which provides extremely precise position indications and whose output varies linearly over a wide range. The encoder is not sensitive to temperature variations, ambient light, or dust. Noise caused by parasitic capacitance is easily eliminated, and an automatic gain control signal may be provided with little difficulty. Although the invention has been described with respect to use with rotating memory systems, it should be appreciated that the encoder can be used in many different types of systems where position indication is required.

We claim:

1. A high resolution capacitive encoder, comprising:
   a first plate having first and second conductive input areas formed thereon, wherein the input areas are separated by a square wave shaped gap having a wavelength $C_p$;
   a second plate whose surface is spaced a predetermined distance from the surface of the first plate for capacitive coupling therebetween, said plates being movable with respect to each other, said second plate including a series of rectangular conductive output areas positioned in facing relation to the gap along the length thereof, each of said output areas having a length equal to one half of the wavelength of the gap and being spaced from adjacent output areas by a distance $C_p/N$, where N is an integer greater than 2;
   means for applying a first periodic signal to the first input area;
   means for applying a second periodic signal which is the inverse of the first signal to the second input area, wherein the first and second signals will capacitively couple to the output areas to provide an output signal at each output area, whereby the maximum amplitude of each output signal will vary linearly as the first and second plates move with respect to each other and will have a null value when equal portions of the respective output area are capacitively coupled to the first and second input areas, wherein N null outputs are generated as the plates move with respect to each other by an amount $C_p$.

2. The encoder of claim 1 wherein the first and second input signals are $A\sin\omega t$ and $-A\sin\omega t$, respectively.

3. The encoder of claim 2 wherein the input and output areas are copper.

4. A high resolution rotary capacitive encoder, comprising:

a first plate having first and second circular concentric equally spaced conductive input areas formed thereon, wherein the input areas are separated by a gap having a cyclic waveform which corresponds to a square wave;

a second plate whose surface is spaced a predetermined distance from the first plate for capacitive coupling therebetween wherein the plates are rotatable with respect to each other, said second plate including a plurality of equally spaced conductive output areas which are arranged in a circle in overlapping relation to the gap, wherein each output area corresponds in shape and area to one half of a wavelength of the gap, whereby as the plates rotate with respect to each other the amount of overlap between each output area and the two input areas will vary linearly;

means for providing a first periodic input signal to the first input area; and means for providing a second periodic input signal to the second input area, wherein the second periodic input signal is the inverse of the first periodic input signal, wherein the input signals will be capacitively coupled to the output areas and wherein each output area will provide a null output when it overlaps the first and second input areas equally.

5. The encoder of claim 4, wherein the gap wavelength is equal to $C_p$ and the output areas are separated by a distance $C_p/N$ where N is an integral, wherein each Nth output area is connected together and wherein the number of output areas is equal to an integer multiple of N.

6. A high resolution capacitive encoder, comprising:
a first plate having first and second conductive input areas formed thereon, wherein the input areas are separated by a gap having a cyclic wave form;

a second plate whose surface is spaced a predetermined distance from the first plate for capacitive coupling therebetween, said plates being movable with respect to each other, said second plate including a series of conductive output areas formed thereon, wherein the output areas are arranged serially in facing relation to the gap and are equally spaced from each other by a predetermined amount;

wherein the gap and output areas are configured so that the portion of each output area which overlaps each respective input area varies linearly between a minimum and maximum as the plates move with respect to each other and wherein when the portion of any output area overlapping the first input area is at a maximum the portion overlapping the second input area is at a minimum;

means for providing a first periodic input signal to the first input area;

means for providing a second periodic input signal to the second input area, wherein the second signal is the inverse of the first signal;

whereby as the plates move with respect to each other the input signals will be capacitively coupled to the output areas in proportion to the overlap between each output area and the respective input areas, each output area providing a null signal when it overlaps the first and second input areas equally.

7. The encoder of claim 6 wherein the input areas and output areas are arranged in a circular fashion.

8. The encoder of claim 6 wherein the input areas and output areas are copper.

9. The encoder of claim 6 wherein the gap is in the shape of a square wave and the output areas are square, wherein the length of each output area is equal to one half of the wavelength of the gap.

10. The encoder of claim 9 wherein the waveform has a wavelength of $C_p$ and the output areas are separated by a distance of $C_p/N$ where N is an integer, wherein each Nth output area is connected together, whereby the encoder will provide null outputs corresponding to N different positions of the plates with respect to each other.

* * * * *